US006976389B2

(12) United States Patent
Farth et al.

(10) Patent No.: US 6,976,389 B2
(45) Date of Patent: Dec. 20, 2005

(54) METHOD FOR SETTING THE NOZZLE OPENING PRESSURE FOR AN INJECTION NOZZLE AND ARRANGEMENT FOR CARRYING OUT THE METHOD

(75) Inventors: Andreas Farth, Erlangen (DE); Andreas Voigt, Regensburg (DE); Matthias Spickenreuther, Obertraubling (DE)

(73) Assignee: Siemens Aktiengesellschaft, Munich (DE)

(*) Notice: Subject to any disclaimer, the term of this patent is extended or adjusted under 35 U.S.C. 154(b) by 180 days.

(21) Appl. No.: 10/454,166

(22) Filed: Jun. 4, 2003

(65) Prior Publication Data

US 2003/0230133 A1 Dec. 18, 2003

(30) Foreign Application Priority Data

Jun. 13, 2002 (DE) ................................ 102 26 397

(51) Int. Cl.[7] ................................ G01M 15/00
(52) U.S. Cl. ................................ 73/119 A
(58) Field of Search .................. 73/119 A; 239/533.9; 123/490

(56) References Cited

U.S. PATENT DOCUMENTS

| | | | | |
|---|---|---|---|---|
| 3,747,479 A * | 7/1973 | Nightingale et al. | .......... | 92/203 |
| 4,497,201 A * | 2/1985 | Allen et al. | ............... | 73/119 A |
| 5,144,841 A * | 9/1992 | Brouwers et al. | ............. | 73/706 |
| 5,712,424 A * | 1/1998 | Reed | ........................... | 73/115 |
| 6,227,175 B1 * | 5/2001 | Jiang et al. | ................. | 123/496 |
| 6,409,094 B2 * | 6/2002 | Tojo et al. | ...................... | 239/5 |
| 6,513,502 B1 * | 2/2003 | Sunwoo et al. | ............. | 123/494 |
| 6,539,925 B2 * | 4/2003 | Rueger et al. | .............. | 123/490 |
| 6,745,465 B1 * | 6/2004 | Shinogle et al. | ......... | 29/888.01 |
| 6,799,090 B2 * | 9/2004 | Farina et al. | ............... | 700/283 |
| 6,837,221 B2 * | 1/2005 | Crofts et al. | ................ | 123/467 |
| 2001/0027780 A1 * | 10/2001 | Rueger et al. | .............. | 123/498 |

FOREIGN PATENT DOCUMENTS

| | | | | |
|---|---|---|---|---|
| DE | 3830510 C1 | 12/1989 | .......... | F02M 65/00 |
| DE | 100 27 181 A1 | 12/2001 | .......... | F02M 65/00 |

* cited by examiner

*Primary Examiner*—Hezron Williams
*Assistant Examiner*—John Fitzgerald
(74) *Attorney, Agent, or Firm*—Baker Botts L.L.P.

(57) ABSTRACT

In order to set the nozzle opening pressure for an injection nozzle, in particular for a diesel injection nozzle, to an accuracy of around ±1%, the method provides that the injection needle is first pressed against the valve seat with a closing force (Fz), and then when two different test pressures (pU, p1, p2) are applied to the injection nozzle the test forces (Fz, F1, F2) effective on the injector needle are measured, with the pressure stage (A) being determined from the measured test forces and the test pressures applied, and finally using the pressure stage (A) a nozzle valve with a suitable valve spring force (Fv) is selected to correspond to the desired nozzle opening pressure (pD).

16 Claims, 1 Drawing Sheet

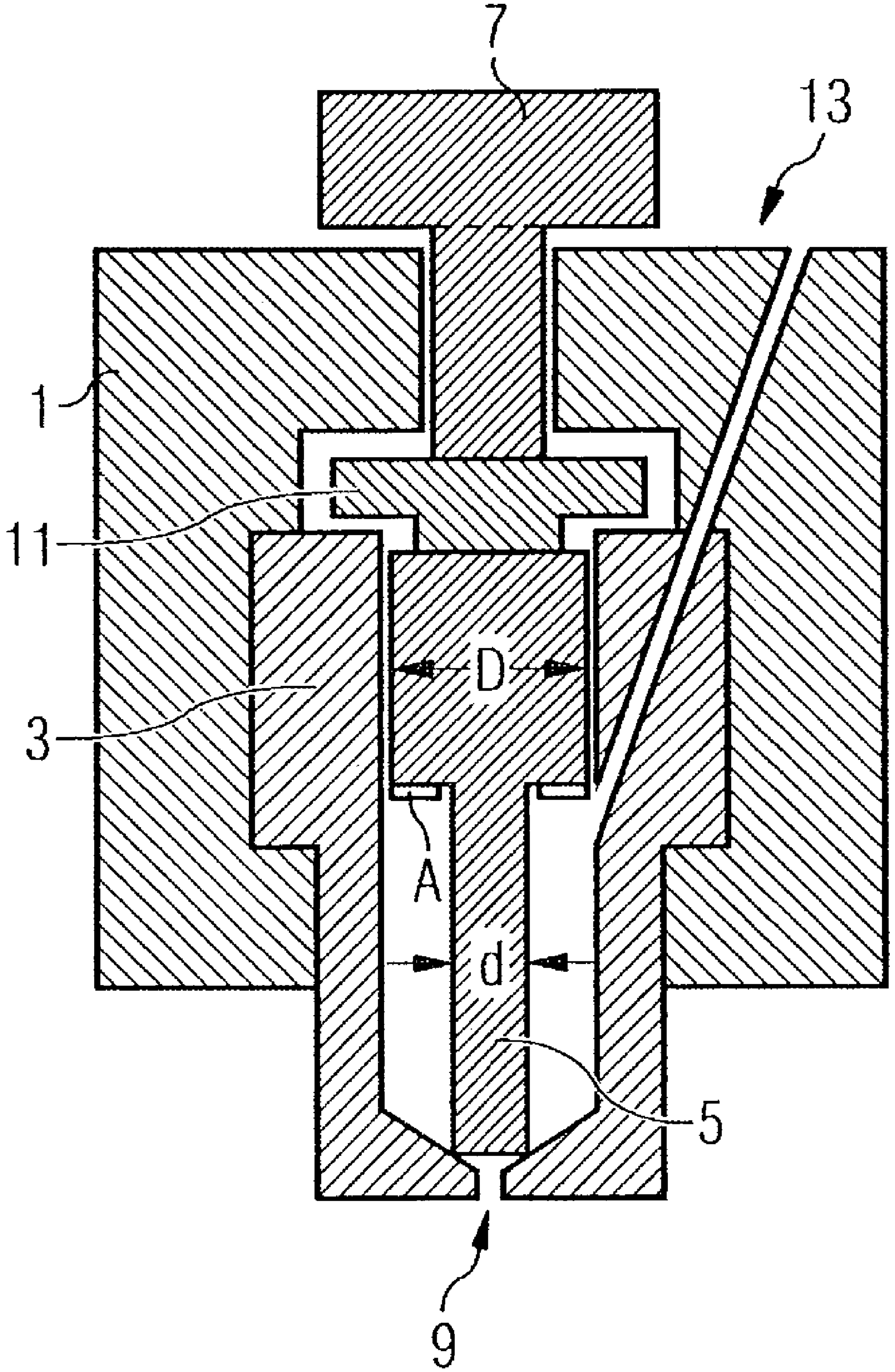
7
13
1
11
D
3
A
d
5
9

METHOD FOR SETTING THE NOZZLE OPENING PRESSURE FOR AN INJECTION NOZZLE AND ARRANGEMENT FOR CARRYING OUT THE METHOD

PRIORITY

This application claims foreign priority of the German application DE 10226397.3 filed on Jun. 13, 2002.

TECHNICAL FIELD OF THE INVENTION

The present invention relates to a method for setting the nozzle opening pressure, in particular for a diesel injection nozzle, and a arrangement for carrying out the method.

BACKGROUND OF THE INVENTION

The determination of the so-called nozzle opening pressure for injection systems is especially important in order that, in spite of random variations from injector to injector, it is possible to realize in a reproducible manner the precise injection of a small pilot quantity. For example, with piezo-pump nozzle elements the prior art permits the nozzle opening pressure to be set with an accuracy of ±2–5%. Even to realize this precision requires a high expenditure on measurement technology.

The internal pressure within the nozzle works on the so-called pressure stage of the nozzle, which specifies the guide and seat diameter of the injector needle. This internal pressure applies a force which opens the injector needle. The injector spring works against this, to ensure that the injector needle remains reliably closed until the nozzle opening pressure is reached. The nozzle opening pressure is determined by the dimensions of the pressure stage of the nozzle and the rigidity of the injector spring. When the value of the pressure stage has been determined, the nozzle opening pressure can be most precisely set by the choice of the injector spring. This is applicable provided that injector springs are available with adequately fine categorization.

In the case of common-rail systems, the prior art has enabled the nozzle opening pressure to be set without any problem, because the pressure stages are specified with extreme accuracy by reference to their cylindrical geometries; here, the diameters are manufactured with an accuracy of ±3 $\mu$m. However, with piezo-pump nozzle elements it can be necessary to change the geometry in the region of the injector needle seat, from a cylindrical seat geometry to non-cylindrical geometries, for example a double-cone geometry. However, for reasons of manufacturing technology, this double-cone can in general only be made to an accuracy of ±50 $\mu$m, at great expense within ±20 $\mu$m. This is, however, not adequate to guarantee the required accuracy of ±1% in the setting of the nozzle opening pressure.

DE 100 27 181 A1 discloses a method for determining the seat diameter, and hence the pressure stage of the nozzle, but with this the accuracy of measurement lies above ±1%. This is due to the fact, on the one hand, that with this method the injector needle is moved, so that the friction which occurs in the process affects the measurement. On the other hand, shortly before the nozzle opening pressure is reached the seal on the injection nozzle becomes slightly leaky, so that the measured value is slightly falsified. Furthermore, this method is also very sensitive with respect to pressure pulses. For this reason, the pressure must be raised as slowly as possible, which results in a disadvantageous increase in the measurement duration with this method.

Another method which has been disclosed for determining the pressure stage of the injection nozzle consists in making a precise optical or geometric measurement of the seat region. When doing so, however, any rounded edges and other tolerances (e.g. roughness, concentricity, coaxilality, etc.) of the injector needle, but also the measurement accuracy of the systems (measurement accuracies in determining diameters and lengths, optical resolution etc.) and abrasion matters (breakages of the reference edges) have such a strong effect that the accuracy demanded above cannot be achieved. Another possibility consists in vibration testing which is, however, generally used for the determination of the frictional properties. This method could also be modified for the determination of the pressure stage, but the friction which arises in the process would represent a critical interference variable, probably reducing the accuracy too greatly.

SUMMARY OF THE INVENTION

The object of the present invention is, in particular for a diesel injection nozzle, to set the nozzle opening pressure with an accuracy of around ±1%.

According to the invention, this can be achieved by a method for setting a nozzle opening pressure, in particular a diesel injection nozzle with an injection needle and a pressure stage, comprising the steps:

pressing the injection needle against the valve seat with a closing force, applying two different test pressures to the injection nozzle, measuring the test forces effective on the injector needle, wherein the pressure stage is determined from the differences between the test forces and the test pressures, and determining by means of the pressure stage a nozzle valve with a suitable valve spring force according to the desired nozzle opening pressure.

The ambient pressure pU can be used as one of the two test pressures, and the closing force can be measured as a test force. The two test pressures may be greater than the ambient pressure. The test pressures applied may differ by a factor of about 2. The test force resulting from the test pressure can be chosen to be less than the closing force. The test force resulting from the test pressure may amount at least to approximately 80–90% of the closing force. The closing force can be chosen to be approximately equal to the expected force of the valve spring.

Another method according to the present invention for setting a nozzle opening pressure comprises the steps:

pressing the injection needle against the valve seat with a closing force, applying a test pressures to the injection nozzle, measuring the resulting test force effective on the injector needle, calculating the pressure stage, determining a suitable valve spring force according to the calculated pressure stage.

Again, the test pressure may be greater than an ambient pressure and may differ by a factor of about 2. The test force resulting from the test pressure can be chosen to be less than the closing force and may amount at least to approximately 80–90% of the closing force. The closing force can be chosen to be approximately equal to the expected force of the valve spring.

The object can also be achieved by an arrangement for setting a nozzle opening pressure, comprising a clamping device which presses the valve needle against the valve seat, a pressure unit for applying a test pressure to the injection valve, and a force sensor for measuring the effective forces on the valve needle in each case.

The force sensor can be held on the clamping device. A pressure fluid channel can be incorporated in the clamping device.

The measurements can be carried out in a comparatively short cycle time, and can be automated, so that the nozzles can be classified and hence the classified nozzle arrays can easily be suitably assigned. The new measurement technique is based on the principle of the "lift force" which arises from the pressure inside the nozzle and in the pressure stage. Here, it is important that the injector needle is pressed into the valve seat, to ensure that only the pressure stage is effective, and not the entire projecting area of the injector needle. With the new measurement technique, the lift force is measured, in the process of which, according to this invention, the injector needle does not move. In order to give the required measurement accuracy, the necessary clamping device must be constructed as rigidly as possible.

The measurement technique is particularly simple and quick if one of the two test pressures used is the ambient pressure. A test force is then obtained directly as the closing force set by the clamping device; that is, no special test pressure needs to be set.

As an alternative to the above, the accuracy of the method can be increased if a true two-point measurement is made. With this, the lift force is determined at two different test pressures, both of which are greater than the ambient pressure, and the area of the pressure stage which produces the nozzle opening pressure can again be determined from the quotient of the applicable differences in the measured test forces or pressures, as appropriate ($A=\Delta F/\Delta p$). As the pressure stage is determined from the differences between two sets of measurements, possible interference variables can be largely cancelled out.

It is important that, in accordance with this invention, at least an adequately large test force is created, because the size of the test force has a decisive effect on the accuracy of the measurement. However, the test forces resulting from the test pressures which are set must always be less than the closing force from the clamping device, so as to ensure reliably that the valve does not open. The determination of the pressure stage is effected by hydraulic measurements, because carrying out pneumatic measurements presents problems due to the high pressures.

According to the invention, provision can also be made that the closing force is chosen to be approximately equal to the expected force of the valve spring in the injection valve under investigation, so as to determine the pressure stage under conditions as near as possible to those pertaining in practice, that is around the working point.

To permit simple swapping of nozzle bodies in the clamping device, and thereby short cycle times, the clamping device or mounting block can be made in two parts. In addition, provision can be made for holding the force sensor on the clamping device.

BRIEF DESCRIPTION OF THE DRAWING

The FIGURE shows a simplified cross-sectional view of the arrangement for setting the nozzle opening pressure for a diesel injection nozzle.

DETAILED DESCRIPTION OF THE PREFERRED EMBODIMENT

Below are described an exemplary form of embodiment for the method in accordance with the invention, and an arrangement used in this connection. The single FIGURE shows a greatly simplified cross-sectional view of the arrangement for setting the nozzle opening pressure for a diesel injection nozzle.

The arrangement has a clamping collet 1, in which is clamped a nozzle body 3 with the injector needle 5 of an injection nozzle. In addition, the press-screw 7 presses the injector needle 5 against the needle seat, and closes the nozzle orifice 9. Arranged between the press-screw 7 and the injector needle 5 is a force sensor 11. The clamping collet 1 has a pressure fluid channel 13 which connects with the fluid line formed within the nozzle body 3. Connected to the pressure fluid channel 13 is a finely controlled pressure supply unit with a precision pressure sensor (not shown). The simplified valve geometry shown in the figure would produce a pressure stage A calculated from the diameters d, D as $A=\pi/4\cdot(D2-d2)$. If the seat region of the injector needle 5 has more complex geometries, such as for example double cone geometry, the quantities D and d can no longer be determined with sufficient accuracy. For this reason it is no longer possible with sufficient accuracy to define a nozzle opening pressure pD, or a corresponding valve spring force Fv, from the relationship $Fv=A\cdot pD$.

For this reason, in order to determine the nozzle opening pressure with the arrangement as shown in the figure, the valve needle 5 in the clamping collet 1 is pressed against the valve seat with a closing force Fz, and this closing force is measured at the ambient pressure pU. A test pressure p1 is then applied, where p1>pU. The test force F1 which then results is measured using the force sensor 11. The pressure stage is then given for an ambient pressure of pU as $$A=(F\mathbf{1}-Fv)/(p\mathbf{1}-pU).$$

The valve spring force Fv, which must be selected, can again be calculated from the desired nozzle opening pressure pD using the relationship $$Fv=A\cdot pD$$

and a corresponding valve spring can be provided and installed in the injection nozzle. Typical values in this process are 80–500 bar for the nozzle opening pressure pD and pressure stages A with a guide diameter of 3.5–6 mm and a seat diameter of 1.5–3 mm. needle. However, the closing force Fz must also be selected to be great enough so that in spite of any expansion or compression of the needle due to the test pressure applied, the nozzle remains reliably closed at the needle seat. In order to permit a rapid change of the different valve bodies, to achieve short cycle times for the measurement method, the clamping device can be made in two parts.

The method in accordance with the invention can be used whenever a precise determination of a pressure stage or an opening pressure is required, and other measurement techniques do not permit the necessary accuracy (e.g. Diesel DI nozzles and valves, Otto DI nozzles and valves).

In order to reduce or compensate for interference variables, particularly additive ones, the method can also be carried out using two different test pressures p1, p2, each of which is greater than the ambient pressure pU. The force resulting in each case, F1, F2 is measured and the pressure stage is accordingly given by $$A=(F1-F2)/p1-p2).$$

In this case, typically p2=p1/2, where it must always be ensured that the test force F1 resulting from the first test pressure p1 lies as close as possible to the absolute value of the closing force Fz. However, any opening of the valve must be reliably excluded, so that any leakage currents which might set in shortly before opening can be excluded with certainty. After the two measurements, the test pressure p2 is first disconnected, the nozzle body 3 is removed from the clamping collet 1 and a new nozzle body with valve needle is clamped in position for the next set of measurements.

A critical feature of the method in accordance with the invention and the corresponding arrangement is that the nozzle body 3 is always held in a unit which does not exhibit any spring effect. As a result, the forces occurring can be determined exactly with no measurement errors. It is important in addition that the landing surface of the nozzle in the region of the orifice, the end face of the press-screw 7 and the end faces of the force sensor 11 are manufactured and arranged to be as nearly as possible in parallel planes to each other, so that as far as possible they only create and measure forces in the axial direction. Correspondingly, the guide for the press screw 7 in the clamping collet 1 should also be arranged to be as exactly as possible vertical with respect to the aforementioned surfaces. The closing force Fz of the injector needle 5 may not be selected to be too large, because the radial play in the guide between the injector needle 5 and the nozzle body 3 is in the region of ±0.5–2 μm; any compression of the injector needle 5 could quickly lead to increased friction between the injector needle and nozzle body in the area of the guide, or even to clamping of the

What is claimed is:

1. A method for setting an opening pressure of an injection nozzle having an injection needle and a pressure stage, said method comprising:

pressing the injection needle against a valve seat with a closing force, applying two different test pressures to the injection nozzle, measuring test forces effective on the injector needle, wherein the pressure stage is determined from the differences between the test forces and the test pressures, and determining by means of the pressure stage a nozzle valve with a suitable valve spring force according to a desired nozzle opening pressure.

2. A method in accordance with claim 1, wherein ambient pressure pU is used as one of the two test pressures, and wherein the closing force is measured as a test force.

3. A method in accordance with claim 1, wherein the two test pressures are greater than ambient pressure.

4. A method in accordance with claim 3, wherein the test pressures applied differ by a factor of about 2.

5. A method in accordance with claim 1, wherein the test force resulting from the test pressure is chosen to be less than the closing force.

6. A method in accordance with claim 1, wherein the test force resulting from the test pressure amounts at least to approximately 80–90% of the closing force.

7. A method in accordance with claim 1, wherein the closing force is chosen to be approximately equal to the expected force of the valve spring.

8. An arrangement for setting a nozzle opening pressure, comprising a clamping device, said device presses a valve needle against a valve seat, a pressure unit for applying a test pressure to an injection valve, and a force sensor for measuring effective forces on the valve needle.

9. An arrangement in accordance with claim 8, wherein the force sensor is held on the clamping device.

10. An arrangement in accordance with claim 8, wherein a pressure fluid channel is incorporated in the clamping device.

11. A method for setting an injection nozzle opening pressure comprising:

pressing an injection needle against a valve seat with a closing force, applying test pressures to the injection nozzle, measuring a resulting test force effective on the injection needle, calculating a pressure stage, and determining a suitable valve spring force according to the calculated pressure stage.

12. A method in accordance with claim 11, wherein the test pressures are greater than an ambient pressure.

13. The method in accordance with claim 11, wherein the test pressures applied differ by a factor of about 2.

14. A method in accordance with claim 11, wherein the test force resulting from a test pressure is chosen to be less than the closing force.

15. A method in accordance with claim 11, wherein the test force resulting from a test pressure amounts at least to approximately 80–90% of the closing force.

16. A method in accordance with claim 11, wherein the closing force is chosen to be approximately equal to the expected force of the valve spring.

* * * * *